United States Patent [19]
Heitmann

[11] 3,913,381
[45] Oct. 21, 1975

[54] METHOD AND APPARATUS FOR TESTING CIGARETTES OR THE LIKE

[75] Inventor: Uwe Heitmann, Hamburg, Germany

[73] Assignee: Hauni-Werke Körber & Co. KG, Hamburg, Germany

[22] Filed: July 5, 1973

[21] Appl. No.: 376,929

[30] Foreign Application Priority Data
July 12, 1972 Germany............................ 2234094

[52] U.S. Cl. ..................................... 73/45.1; 73/37
[51] Int. Cl. ............................................ G01m 3/26
[58] Field of Search ............... 73/45.2, 45.1, 45, 41, 73/38, 37

[56] References Cited
UNITED STATES PATENTS
3,395,570  8/1968  Kochalski ............................ 73/45.2
3,408,858  11/1968  Kaeding et al. ........................ 73/38
3,677,068  7/1972  Schmermund ........................ 73/41

FOREIGN PATENTS OR APPLICATIONS
1,048,661  11/1966  United Kingdom .................. 73/45.2

Primary Examiner—Jerry W. Myracle
Assistant Examiner—Marcus S. Rasco
Attorney, Agent, or Firm—Michael S. Striker

[57] ABSTRACT

Filter cigarettes or analogous rod-shaped smokers' products are tested while travelling sideways in the flutes of a conveyor past a stationary cover which partially seals the flutes from the atmosphere. During travel past the cover, the interior of each flute is maintained above or below atmosphric pressure and the interior of the wrapper of an article in such flute is maintained below or above atmospheric pressure so that the air flows from the flute into the interior of a leaky wrapper or from the interior of a leaky wrapper into the flute. The changes in air pressure in the flutes and/or in the wrappers are monitored by a transducer which furnishes signals serving for segregation of articles having defective wrappers. The flutes can be subdivided into several portions, as considered in the axial direction of wrappers, and each such portion can be maintained at a different pressure.

20 Claims, 5 Drawing Figures

METHOD AND APPARATUS FOR TESTING CIGARETTES OR THE LIKE

BACKGROUND OF THE INVENTION

The present invention relates to a method and apparatus for testing cigarettes or analogous articles which consist of or comprise open-ended tubular wrappers. More particularly, the invention relates to improvements in a method and apparatus for testing the quality of fillers and/or wrappers of cigarettes or the like by means of a testing fluid. Still more particularly, the invention relates to improvements in a method and apparatus for testing cigarettes or the like with a gaseous testing fluid and in such a way that, during testing, the pressure in the interior of a satisfactory wrapper differs from the pressure around the wrapper but any leaks or similar defects of a wrapper result in a change of fluid pressure in the interior and/or around the defective wrapper. Such change of fluid pressure is detected and utilized for the generation of signals serving to segregate the defective article from satisfactory articles.

It is customary to test plain or filter-tipped cigarettes, cigars, cigarillos and/or filter rod sections for the quality of their fillers and/or wrappers. The testing operation can be carried out during or subsequent to manufacture of articles, and is performed mainly to detect defects in the wrappers, such as holes, frayed or torn or slanting ends, open seams, absence of uniting bands and/or two or more of these defects. The defects of wrappers are particularly unpleasant to the purchaser because they allow large quantities of air to enter the article during smoking. In a filter cigarette, cigar or cigarillo, the critical part of the wrapper is that portion where the tobacco-containing section is united with a filter plug. The following part of this description will refer primarily to filter cigars, cigarillos or cigarettes with the understanding, however, that the method and apparatus of the invention can be used with equal advantage for the testing of empty filter tubes, filter rod sections and/or plain cigarettes, cigarillos or cigars.

In accordance with a presently known method, filter cigarettes of double unit length are tested in an apparatus wherein compressed air is introduced into both ends of each of a succession of filter cigarettes. If a filter cigarette has a leaky wrapper, the pressure of air in its wrapper decreases below a predetermined value which is still indicative of satisfactory wrappers, and such drop in pressure is detected by a suitable transducer which furnishes signals serving for ejection or segregation of filter cigarettes with defective wrappers from acceptable filter cigarettes. The just described testing procedure is quite satisfactory for detection of defects in or close to the ends of wrappers but is less effective for the detection of leaks or other defects in the intermediate portions of filter cigarettes of double unit length, i.e., in the regions where a filter plug of double unit length is connected with the adjoining ends of two tobacco rod sections of unit length. This is due to the fact that the tobacco fillers of such cigarettes offer a substantial resistance to the flow of air streams from the ends of the wrapper toward the filter plug. Moreover, the wrappers are normally porous so that some air escapes therethrough prior to reaching the inner ends of the tobacco rod sections and the filter plug therebetween. Therefore, a hole in that portion of the wrapper which is close to the filter plug will cause a less pronounced drop in air pressure than an equally large or even a smaller hole close to the one or the other end of the wrapper.

It is also known to blow compressed air into one end of a filter cigarette of unit length or multiple unit length and to measure the pressure of air which issues at the other end. This method is more satisfactory as regards the detection of leaks in an intermediate portion of the wrapper; however, the air stream which enters at one end and leaves at the other end invariably entrains smaller tobacco shreds and/or tobacco dust whereby such particles clog the conduits wherein the air is conveyed to the transducer and/or cause excessive wear on the sealing elements which engage the ends of wrappers during testing. Moreover, when the tested articles are filter cigarettes of unit length, the sealing of free ends of the filter plugs presents serious problems. This is due to the fact that the exposed end faces of filter plugs are often located in planes which are not exactly normal to the axes of filter cigarettes and the sealing elements normally comprise tubes which are caused to move axially against the ends of filter plugs. Consequently, the air which escapes between the end face of a filter plug and the corresponding sealing element might suffice to cause the generation of a "defect" signal even though the cigarette is quite satisfactory except that the exposed end face of its filter plug is not exactly normal to its axis. The just described problems in connection with the sealing of exposed ends of filter plugs arise irrespective of whether the filter cigarettes of unit length are tested by simultaneous introduction of compressed air at both ends or by introduction of compressed air at one end and by measurement of air pressure at the other end.

It is further known to test filter cigarettes or the like in apparatus which utilize suction generating means serving to draw streams of air from one or both ends of the wrappers. The problems in connection with testing by means of suction air streams are practically identical with or clearly analogous to the aforedescribed problems which arise when the cigarettes are tested with streams of compressed air.

In accordance with still another proposal, filter cigarettes of unit length are tested in an apparatus wherein the cigarette is introduced into a suction chamber, the tobacco-containing end of the cigarette is sealed, and the exposed end of the filter plug is connected with the atmosphere by way of a flow restrictor. A stream of air flows from the atmosphere, through the flow restrictor, into the filter plug and tobacco-containing section, through the pores of the wrapper, and into the suction chamber. If the pressure of air in the suction chamber rises above a predetermined value, this indicates that the wrapper has a leak (e.g., an open seam or a hole). Such rise in pressure is detected by a transducer which generates signals for ejection of the defective cigarette. As a rule, the transducer measures the air pressure between the filter plug and the flow restrictor.

The just described testing procedure exhibits a number of important advantages. Thus, the testing is most reliable in the region of the filter plug, and unsatisfactory seals between the ends of the filter cigarette and the atmosphere cannot unduly affect the quality of the testing operation. However, such mode of testing also exhibits a number of serious drawbacks, especially because the difference between the air pressure during testing of a satisfactory article and the air pressure during testing of a defective article is very large. When the cigarettes are tested in rapid sequence, e.g., at the rate of seventy per second, the very pronounced differences between successively detected air pressures create problems in connection with the transmission and evaluation of signals. Moreover, improper sealing of cigarette ends results in a weakening of test signals whereas the presence of leaks results in an intensification of test signals; therefore, when the sealing action is improper, defective cigarettes are likely to remain undetected if their ends are improperly sealed because the signal which is indicative of improper sealing cancels the signal which is indicative of a defective wrapper.

As mentioned hereinabove, the most critical portion of a filter cigarette is in the region of the connection between the tobacco rod section and the filter plug. Any air which might be able to enter in such region is likely to greatly affect the flow of tobacco smoke into the mouth and is thus likely to irritate the purchaser. On the other hand, tears, holes or frayed cigarette paper at the tobacco-containing end of the filter cigarette, as well as inclined end faces of tobacco-containing ends and/or filter plugs, are less irritating because they might affect the appearance of the article but not the burning of tobacco and/or the flow of smoke. This will be readily appreciated since that end of the wrapper which is filled with tobacco is burned as soon as the filter cigarette is lighted so that, in most instances, the smoker does not even notice that such end is or was defective.

SUMMARY OF THE INVENTION

An object of the invention is to provide a novel and improved method of testing cigarettes or analogous rod-shaped or tubular smokers' products and/or their components according to which the critical portions of wrappers can be tested with a higher degree of accuracy than the other portions and according to which the quality of the testing operation in any selected region of a wrapper can be changed and regulated at will.

Another object of the invention is to provide a method of testing cigarettes or the like according to which improper sealing of the ends of wrappers cannot unduly affect the quality of testing and according to which the testing operation can be carried out along a desired length of the wrapper, namely, along that length which is most likely to exhibit defects or wherein the defects are most likely to adversely affect the enjoyment during smoking.

A further object of the invention is to provide a relatively simple, versatile and reliable apparatus for the practice of the above outlined method.

One feature of the invention resides in the provision of a method of testing cigarettes or analogous articles having or consisting of open-ended wrappers. The method comprises the steps of maintaining a first body of gas (e.g., air) in the interior of the wrapper of an article to be tested at a first pressure and simultaneously maintaining a second body of gas (e.g., air) around the wrapper of the article to be tested at at least one second pressure. The novelty resides in that one of the first and second pressures exceeds and the other of the first and second pressures is less than atmospheric pressure so that the gas flows from the higher-pressure body, through the leaky part or parts of a defective wrapper, and to the lower-pressure body whereby the pressure of gas forming the lower-pressure body increases and the pressure of gas forming the high-pressure body decreases. The method further comprises the step of monitoring the changes in pressure of at least one of the first and second bodies and generating signals at least when the pressure of the monitored body is without a predetermined range which is indicative of satisfactory wrappers. Such signals can be used to segregate the article having a defective wrapper from articles with satisfactory wrappers.

The second body of gas around the wrapper of an article to be tested can be subdivided into a plurality of at least partially segregated or sealed bodies each of which surrounds a different portion of the wrapper, as considered in the axial direction of the article to be tested. Each such segregated body of gas is preferably maintained at a different second pressure.

The second body of gas may but need not surround the entire wrapper, as considered in the axial direction of the article to be tested; for example, the second body may surround an intermediate portion of the wrapper.

The article to be tested is preferably moved sideways while the first and second bodies of gas are respectively maintained at the aforementioned first and second pressures. At the present time, it is preferred to monitor changes in the pressure of the first body which is confined in the interior of the wrapper.

In order to prevent the first body of gas from communicating with the second body of gas during testing, the testing apparatus preferably comprises sealing means having parts (such as a flange and a tube which is movable axially of the article to be tested) which are arranged to engage the wrapper in the region of each open end to restrict (reduce or totally prevent) the flow of gas between the interior of the wrapper and the atmosphere by way of the open ends of the wrapper. The apparatus further comprises means for maintaining in a wrapper which is engaged by the sealing means a first body of gas at the first pressure and means for confining around the thus engaged wrapper a second body of gas at the second pressure. The means for maintaining and the means for confining may be connected to a common blower or the like which can evacuate gas from the interior of a wrapper or from the space around the wrapper and which can also supply compressed gas into the space around the wrapper or into the interior of the wrapper.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
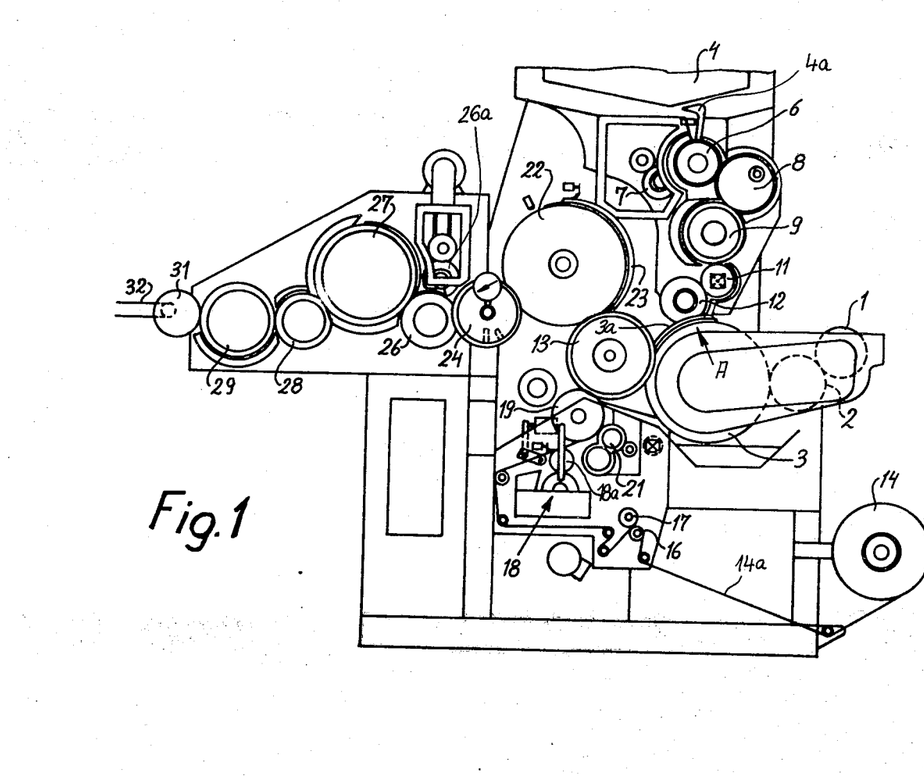
FIG. 1 is a side elevational view of a filter cigarette making machine including a testing apparatus which embodies one form of the invention.

FIG. 1 illustrates a filter cigarette making machine of the type known as MAX and produced by Hauni-Werke, Korber and Co. K. G., Hamburg-Bergedorf, Western Germany. The machine comprises a drum-shaped transfer conveyor 1 which transports two rows of plain cigarettes of unit length sideways in such a way that the cigarettes of one row are staggered with respect to the cigarettes of the other row. The drum 1 transfers the two rows of plain cigarettes onto two discrete aligning conveyors or drums 2 which, in turn, transfer pairs of plain cigarettes into successive axially parallel peripheral receiving means or flutes of an assembly conveyor 3. During transport of the respective row of cigarettes from the transfer drum 1 to the assembly conveyor 3, one of the aligning drums 2 changes the speed or the extent of movement of the respective row of plain cigarettes so that each flute of the assembly conveyor 3 receives two coaxial plain cigarettes. The cigarettes of each pair of cigarettes in the flutes of the assembly conveyor 3 are spaced apart by a distance which slightly exceeds the length of a filter rod section or plug of double unit length.

Filter rod sections of six times unit length are stored in a magazine 4 and are discharged therefrom in the form of a single row wherein the cigarettes advance sideways through a chute 4a and into successive axially parallel flutes of a severing conveyor 6 which cooperates with two coaxial rotary disk-shaped knives 7 (only one shown) to subdivide each filter rod section of six times unit length into three coaxial filter rod sections of double unit length (hereinafter called filter plugs). The groups of three coaxial filter plugs each are taken over by three shuffling conveyors 8 which stagger the filter plugs in such a way that each flute of a transfer drum 9 which is located downstream of the shuffling conveyors 8 receives a single filter plug. The single row of filter plugs is transferred from the drum 9 onto an accelerating conveyor 11 which, in turn, transfers the filter plugs into successive flutes of an inserting drum 12 located at a transfer station A where the filter plugs are introduced seriatim into successive flutes of the assembly conveyor 3. The arrangement is such that each filter plug which is transferred at the station A enters between a pair of coaxial plain cigarettes of unit length whereby such plain cigarettes form with the respective filter plug a group of three coaxial rod-shaped articles which are transferred into successive flutes of a further drum 13. Prior to leaving the assembly conveyor 3, the rod-shaped articles of each group are condensed in such a way that the clearances between the filter plugs and the respective plain cigarettes disappear. This is achieved by two condensing cams 3a (only one shown) which can cause one of the plain cigarettes to move toward the other plain cigarette or which can cause both plain cigarettes of a group to move toward the respective end of the associated filter plug.

During transport with the drum 13, each group of three rod-shaped articles is provided with an adhesive-coated uniting band consisting of cigarette paper, reconstituted tobacco, cork or other suitable wrapping material. The uniting bands are obtained by subdivision of an elongated web 14a which is stored in the form of a roll 14 and is fed lengthwise by a pair of advancing rolls 16, 17. The underside of the travelling web 14a moves along the periphery of a roller-shaped applicator 18a which forms part of a conventional paster 18 serving to coat the underside of the web 14a with a layer of adhesive paste. The leading end of the web 14a is attracted to the periphery of a cutting drum 19 which is provided with suction ports serving to attract the uncoated side of the web. The drum 19 cooperates with a rotating knife 21 having one or more blades which sever the web 14a at regular intervals so that the web yields a succession of adhesive-coated uniting bands each of which is immediately transferred onto the adjacent group of rod-shaped articles on the drum 13. The uniting bands are attached to the respective groups in such a way that they adhere to the filter plug as well as to the innermost portions of the respective plain cigarettes.

The groups of rod-shaped articles, each of which carries a uniting band, are thereupon transferred onto a rolling or wrapping conveyor 22 which cooperates with a complementary rolling element 23 to convolute the uniting bands around the respective groups so that each such group is converted into a filter cigarette of double unit length in a manner well known from the art of filter cigarette making machines. Successive filter cigarettes of double unit length are thereupon transferred onto a testing conveyor 24 where the cigarettes are tested for the quality of their filters and/or wrappers and the defective cigarettes are segregated from satisfactory cigarettes prior or subsequent to leaving the testing conveyor 24. At least the satisfactory filter cigarettes of double unit length are transferred onto a severing conveyor 26 which cooperates with a rotary disk-shaped knife 26a to subdivide each filter cigarette of double unit length into two coaxial filter cigarettes of unit length. The pairs of filter cigarettes of unit length are thereupon transferred onto an inverting conveyor 27 which inverts one filter cigarette of each pair end-for-end so that the pairs of filter cigarettes of unit length are converted into a single row wherein the cigarettes travel sideways. The single row of filter cigarettes of unit length is then taken over by a transfer conveyor 28 which transfers them to a second testing conveyor 29 wherein the tobacco-containing ends of cigarettes are tested for firmness and the defective cigarettes ejected or otherwise segregated from satisfactory cigarettes. The satisfactory cigarettes are transferred onto a further conveyor 31 which deposits them on the upper stretch of an endless conveyor belt 32 serving to advance the cigarettes to a packing machine, to a tray filling apparatus or directly to storage.

Figure 2:
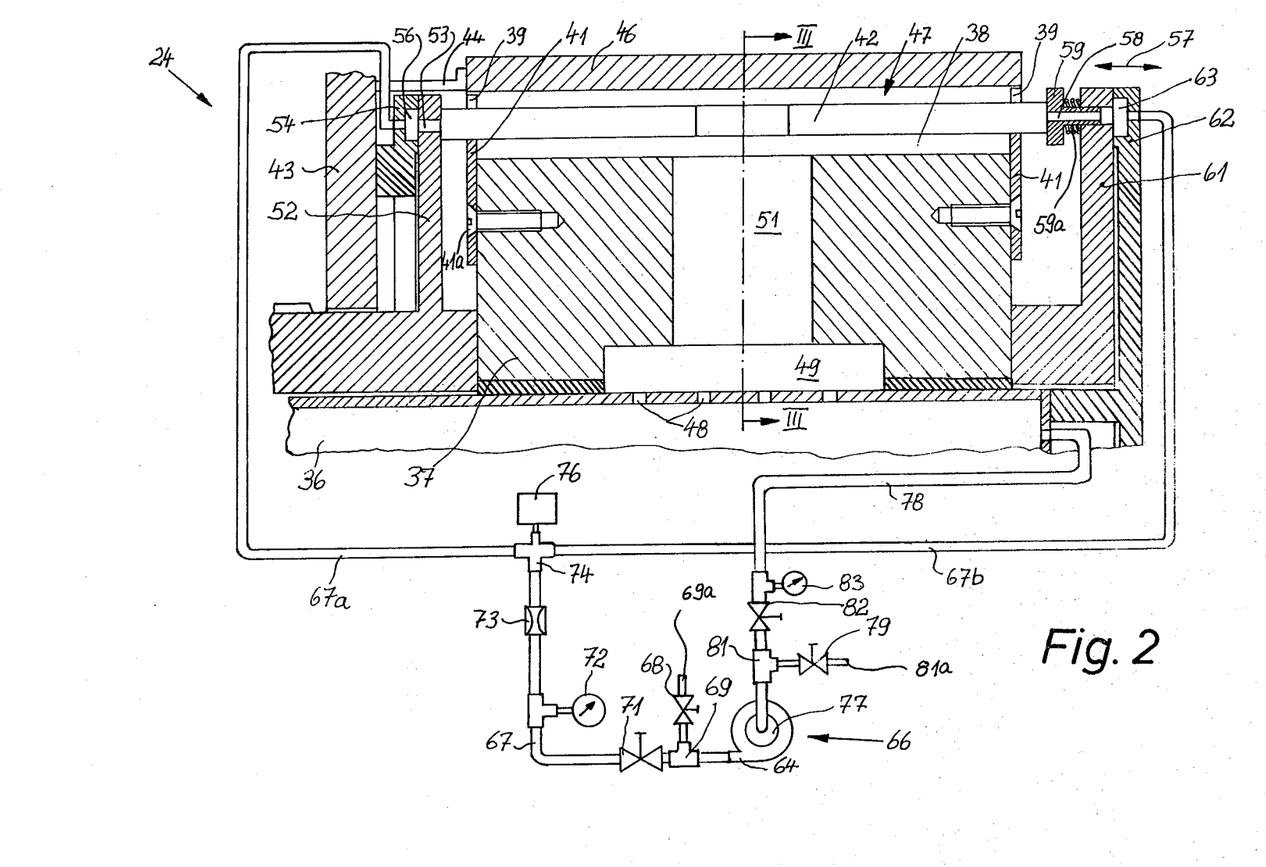
FIG. 2 is an enlarged fragmentary axial sectional view of the conveyor of the testing apparatus of FIG. 1, further showing diagrammatically the source of testing fluid and the transducer of the testing apparatus.
Figure 3:
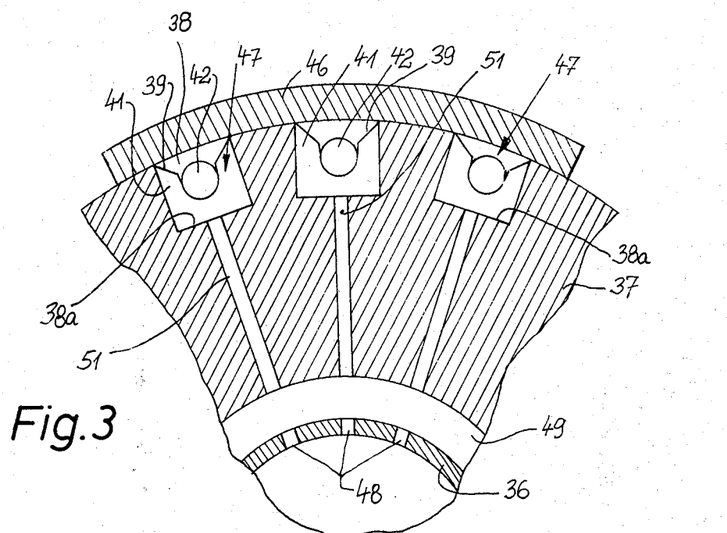
FIG. 3 is a sectional view as seen in the direction of arrows from the line III—III of FIG. 2.

A feature of the invention resides in the construction and mode of operation of a testing apparatus which includes the aforementioned testing conveyor 24. The details of this testing apparatus are illustrated in FIGS. 2 and 3. As shown, the testing conveyor 24 comprises a cylindrical drum-shaped body 37 which is mounted on and can rotate relative to a stationary hollow shaft 36. The drum-shaped body 37 is driven continuously in synchronism with other conveyors of the filter cigarette making machine. Each end of the body 37 supports an annulus of equidistant article-supporting elements in the form of cradles 41 having substantially semicircular recesses or sockets 39 for reception of portions of rod-shaped articles 42 each of which constitutes a filter cigarette of double unit length. The inner end portions of the cradles 41 are separably attached to the respective end faces of the drum-shaped body 37 by bolts 41a or analogous fasteners. The cradles 41 may consist of metallic sheet material and the sockets 39 of one group or annulus of cradles 41 are aligned with the sockets 39 of the other group of cradles. As shown in FIG. 2, the distance between the two groups of cradles 41 is less than the length of an article 42 so that the end portions of properly inserted articles extend axially of the body 37 beyond the respective pair of sockets 39. The frame 43 of the filter cigarette making machine supports an arcuate cover or shroud 46 which is secured thereto by brackets 44 and overlaps a portion of the drum-shaped body 37 so as to convert the spaces between those cradles 41 which travel along the concave underside of the shroud 46 into a succession of chambers 47 receiving the major portions of articles 42 during travel along an arcuate path where the articles are tested for the quality of their filters and/or wrappers. FIG. 3 shows that the convex peripheral surface of the drum-shaped body 37 of the testing conveyor 24 can move into actual contact with the concave underside of the shroud 46 to thereby insure that the chambers 47 are substantially sealed from the surrounding atmosphere. In fact, each chamber 47 can communicate with the atmosphere only by way of the spaces between the open upper sides of the sockets 39 and the concave underside of the shroud 46 while the respective cradles 41 travel past the testing station. Each chamber 47 is defined in part by the body 37 and its cradles 41 and in part by the shroud 46.

The means for evacuating at least some air from the chambers 47 comprises radially inwardly extending suction slots 51 which are provided in the body 37 and whose outer ends are located between pairs of aligned cradles 41. The inner end portions of the suction slots 51 communicate with a cylindrical compartment 49 which is machined into the innermost portion of the body 37 and communicates with the interior of the shaft 36 by way of orifices 48 provided in the cylindrical wall of the shaft 36. The interior of the shaft 36 is connected with a combined source of compressed air and suction generating device 66 shown in the lower portion of FIG. 2.

The means for maintaining the interior of each article 42 which travels below the shroud 46 at a pressure which exceeds atmospheric pressure comprises a sealing element or flange 52 which rotates with the drum-shaped body 37 and is provided with ports 53 each of which registers with the socket 39 of the adjacent cradle 41. The outer side of the sealing element or flange 52 is adjacent to a stationary ring-shaped valve plate 54 which is secured to the frame member 43 of the filter cigarette making machine and is provided with an arcuate groove 56 connected to the device 66 by means of a supply conduit 67a for compressed gaseous testing fluid. The groove 56 of the valve plate 54 communicates with those ports 53 which travel below the shroud 46 so that the left-hand ends of the wrappers of articles 42 travelling in the suction chambers 47 receive streams of compressed gaseous fluid from the pressure side 64 of the device 66. The latter preferably constitutes a blower or fan which draws air from the interior of the hollow shaft 36 and blows compressed air into a conduit 67 which communicates with the aforementioned conduit 67a by means of a junction 74.

The right-hand ends of the wrappers of articles 42, as viewed in FIG. 2, can be temporarily sealed by sealing elements in the form of tubes or caps 59 which are movable axially of the articles 42 and are mounted on a support here shown as a flange 61 secured to the continuously rotating drum-shaped body 37. The tubes 59 are biased axially toward the adjacent ends of the respective articles 42 by weak helical springs 59a and are provided with axial bores or passages 58 by means of which they can admit streams of compressed gaseous fluid into the adjacent ends of wrappers of the articles 42. The directions in which the tubes 59 can be reciprocated in order to move toward or away from sealing engagement with the adjacent ends of wrappers are indicated by a double-headed arrow 57. The axial bores 58 of the tubes 59 can receive compressed gas from the arcuate groove 63 of a stationary valve plate 62 which is secured to the shaft 36 and is adjacent to the outer side of the flange 61. The groove 63 is connected with the junction 74 by means of a conduit 67b.

The pressure outlet of the blower 66 is shown at 64. This outlet is connected to a tee 69 which, in turn, is connected with the conduit 67 and hence with the junction 74. The tee 69 is further connected with a branch conduit 69a containing a pressure reducing valve 68 which is adjustable by hand or by remote control. A further reducing valve 71 is mounted in the conduit 67 upstream of the junction 74. The conduit 67 is also connected with a pressure gauge 72 and contains a preferably adjustable flow restrictor 73 located upstream of the junction 74. The reference character 76 denotes a transducer which can produce electric signals indicating the pressure of gaseous fluid in the conduits 67a and 67b. The transducer 76 controls a suitable ejector, for example, a nozzle (not shown) which can eject defective cigarettes 42 from the respective cradles 41 before such defective cigarettes leave the testing conveyor 24. The ejector is not shown in the drawing because its construction and mode of operation are conventional. For example, the transducer 76 may comprise a diaphragm which forms part of a capacitor serving as a means for producing electric signals when the pressure of gaseous fluid (normally air) in the conduits 67a and 67b is without a predetermined range which is indicative of satisfactory articles 42.

The suction inlet 77 of the blower 66 is connected with the interior of the shaft 36 by a conduit 78 which is further connected with a pressure gauge 83 and a pressure reducing valve 82. A further pressure reducing valve 79 is installed in a branch conduit 81a connected to a tee 81 in the conduit 78 upstream of the reducing valve 82.

As best shown in FIG. 3, the periphery of the drum-shaped body 37 of the testing conveyor 24 is provided with equidistant axially parallel article receiving means of flutes 38. The depth of each flute 38 exceeds the diameter of an article 42, and the sockets 39 at the ends of the flutes 38 are positioned in such a way that an article 42 which is received in the sockets 39 is spaced apart from the bottom surface 38a of the respective flute as well as from the concave internal surface of the shroud 46 while the article travels past the testing station, namely, while the corresponding port 53 communicates with the groove 56 of the valve plate 54 and the bore 58 of the corresponding tube 59 communicates with the groove 63 of the valve plate 62. This insures that the entire intermediate portion of the wrapper of the article 42 in a flute 38 is surrounded by a body of air whose pressure is less than atmospheric pressure. Such body of air extends between the respective cradles 41 and is permitted to communicate with the atmosphere only by way of the outermost portions of the respective sockets 39, i.e., by way of those portions of the sockets 39 which are not filled by an article 42.

The operation of the testing apparatus including the structure of FIGS. 2 and 3 is as follows:

The operator manipulates the adjustable reducing valves 79, 82, 68 and 71 so as to insure that the pressure gauges 83 and 72 respectively indicate a desired superatmospheric pressure in the conduits 67a, 67b and a desired subatmospheric pressure in the hollow shaft 36. The wrapping conveyor 22 of FIG. 1 delivers filter cigarettes 42 of double unit length into successive pairs of aligned sockets 39 before such sockets advance along the concave inner side of the shroud 46. As mentioned above, the flutes 38 in the periphery of the drum-shaped body 37 are deep enough to insure that the wrappers of articles 42 in the cradles 41 do not contact the bottom surfaces 38a of the flutes. In other words, each article 42 which advances along the concave underside of the shroud 46 is supported only at two points, namely, along the surfaces which surround the respective sockets 39. The major portions of the wrappers of articles 42 are fully exposed so that the testing apparatus can readily detect their defects, such as open seams, holes, slits, the absence of filter plugs and/or others.

The tubes 59 are caused to move toward the respective ends of articles 42 not later than when the articles advance below the shroud 46 whereby the articles are moved axially and abut against the rotating flange 52 so that their left-hand ends, as viewed in FIG. 2, communicate with the respective ports 53 and receive compressed gaseous testing fluid by way of the conduit 67a and groove 56 in the stationary valve plate 54. The means for moving the tubes 59 axially in directions indicated by the double-headed arrow 57 normally comprises suitable followers which track a stationary cam, not shown. Reference may be had to U.S. Pat. No. 3,543,564 granted Dec. 1, 1970 to Heitman.

The suction inlet 77 of the blower 66 withdraws air from the chambers 47 by way of the respective suction slots 51, compartment 49, orifices 48, the interior of the stationary shaft 36 and conduit 78. Thus, the exterior of each wrapper which advances in a chamber 47 along the inner side of the shroud 46 is subjected to subatmospheric pressure whereas the interior of such wrapper is subjected to superatmospheric pressure due to introduction of compressed gas by way of the ports 53 and axial bores 58 of the respective tubes 59. The fact that the sockets 39 allow some air to flow into the chambers 47 during travel of articles 42 along the inner side of the shroud 46 does not adversely affect the testing operation because the amounts of air which can enter the chambers 47 by way of the sockets 39 are small as compared to the amounts of air which are being withdrawn by way of the respective slots 51. Thus, the pressure of air in the chambers 47 is invariably below atmospheric pressure.

The length of the arcuate grooves 56 and 63 in the valve plates 54 and 62 is preferably selected in such a way that the wrappers of articles 42 receive compressed gaseous fluid during a reasonably long interval of time which insures that the pressure in the conduits 67a and 67b can drop sufficiently if the wrappers of the articles 42 have defective parts which permit gas to flow from their interior into the suction chamber 47. Such drop of pressure in the conduit 67a is detected by the transducer 76 which transmits an appropriate signal to the ejector so that the defective articles are segregated from satisfactory articles not later than when they reach the conveyor 31 of FIG. 1.

It will be noted that the end portions of articles 42 extend beyond the respective sockets 39 so that they are not received in the respective chambers 47 during testing. In other words, the pressure around the ends of wrappers is higher than the pressure around the intermediate portions of the wrappers which are received in the chambers 47. This is normally desirable since the defects of the ends of a wrapper are less damaging than the defects of the wrapper in the region of the convoluted uniting band which connects the filter plug to the respective plain cigarettes of unit length. This will be readily appreciated since a frayed end of the wrapper might detract from the appearance of an article 42 but such frayed end will be consumed immediately as soon as the cigarette is lighted. The sensitivity of the testing apparatus in the region of the ends of wrappers of articles 42 which are being advanced along the inner side of the shroud 46 can be reduced further by adjusting the valves 68 and 71 in such a way that the pressure of gas in the conduits 67a and 67b exceeds only slightly the atmosphere pressure while, on the other hand, adjusting the reducing valves 79 and 82 in such a way that the pressure in the chambers 47 is well below atmospheric pressure. This enables an attendant to insure that the transducer 76 does not produce signals which are indicative of defective articles when the tubes 59 do not properly seal the adjacent ends of the wrappers and/or when the inner side of the flange 52 does not properly seal the left-hand ends of the wrappers, as viewed in FIG. 2.

An important advantage of the testing apparatus of FIGS. 2 and 3 is that the testing operation is highly reliable even if the pressure of the body of gas in the wrapper of an article 42 advancing past the testing station only slightly exceeds atmospheric pressure and the pressure of the body of gas in the respective chamber 47 (i.e., of the body of gas which surrounds the intermediate portion of such article) is only slightly less than atmospheric pressure. The difference between the two pressures (i.e., between the negative pressure around the wrapper and the positive pressure in the wrapper) suffices to insure that the pressure of gas in the conduit 67a decreases below a predetermined pressure which is still indicative of a satisfactory article whenever the intermediate portion of the wrapper comprises one or more leaky parts which allow gas to flow from the interior of the wrapper into the respective chamber 47. The difference between the gas pressure in the ends of a wrapper and the gas pressure around the ends of the wrapper is less pronounced, i.e., the testing apparatus is less sensitive in the regions which are outwardly adjacent to the cradles 41 because the outer end portions of the wrappers are subjected to atmospheric (not to subatmospheric) pressure. This is due to the fact that the distance between a pair of aligned cradles 41 (i.e., the length of a chamber 47 or flutes 38) is less than the length of an article 42.

Another advantage of the testing apparatus of FIGS. 2 and 3 is that it can determine the quality of wrappers of articles 42 immediately upon completed making of such articles, i.e., as soon as the articles leave the rolling conveyor 22 of the machine shown in FIG. 1. Also, the testing takes place at the same speed at which the articles 42 are being produced. This is made possible by using a testing conveyor 24 which moves the articles 42 continuously, rather than stepwise, and in synchronism with movements of other conveyors in the machine of FIG. 1.

The monitoring of gas pressure in the interior of each article 42 which advances past the testing station is preferred at this time (even though it is equally possible to monitor the pressure of gas in the chambers 47) because the pressure of gas in the interior of a tested wrapper is less dependent on unpredictable factors than the pressure of gas in the respective chamber 47. This is due to the fact that the chambers 47 normally communicate with the atmosphere by way of the outer ends of the respective sockets 39 whereas the sealing elements 52 and 59 are more likely to prevent or to greatly restrict the flow of testing fluid between the interior of a tested wrapper and the surrounding atmosphere. Complete sealing of each chamber 47 from the atmosphere can be achieved only at a considerable cost and, as mentioned above, such complete sealing is not even necessary because some leakage of gas between the chambers 47 and the atmosphere does not unduly affect the quality of the testing operation. The outer ends of the sockets 39 are preferably wider than their inner ends because such configuration of the sockets insures a more convenient introduction of articles 42 into and a more convenient removal of articles from the cradles 41.

Figure 4:
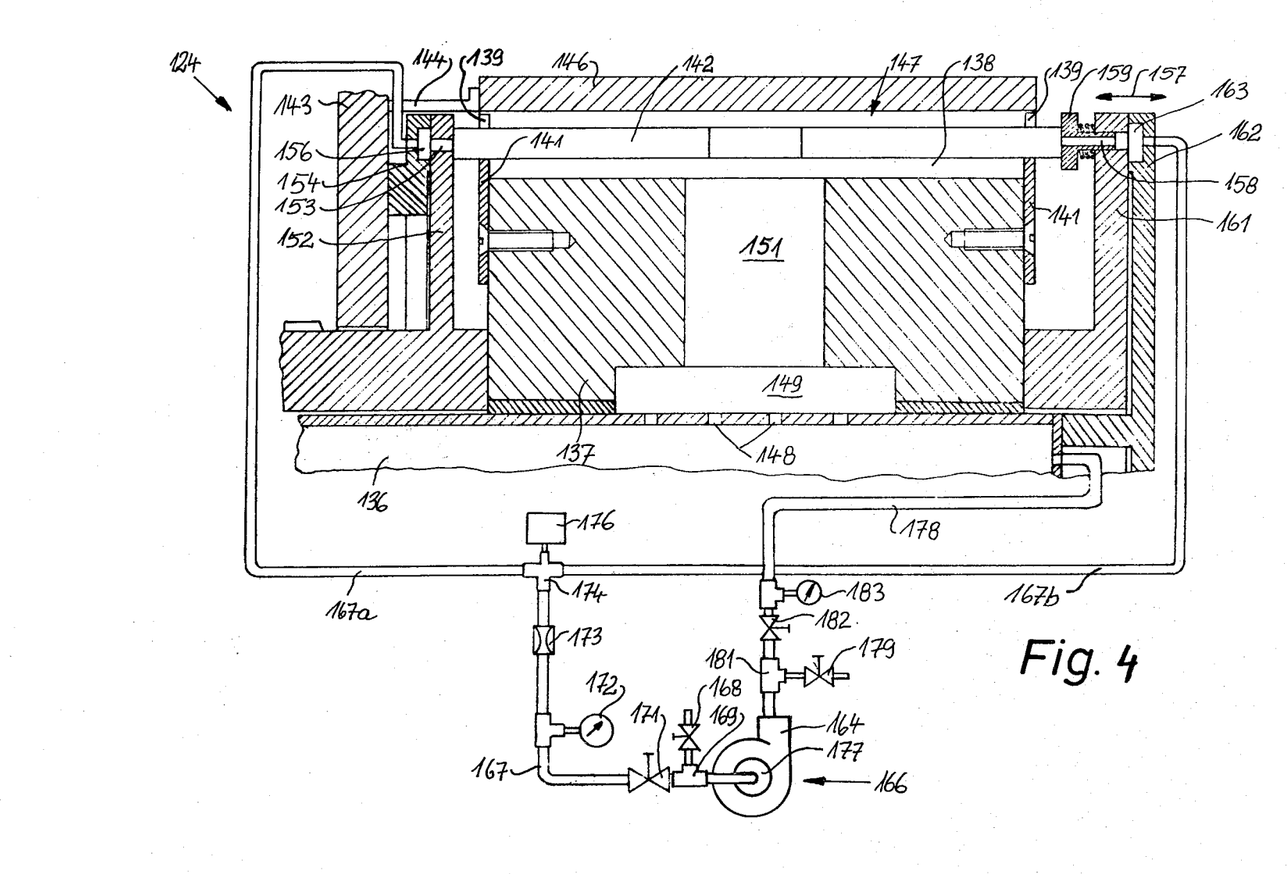
FIG. 4 is a view similar to that of FIG. 2 but showing a second testing apparatus.

FIG. 4 illustrates a portion of a second testing apparatus wherein all such parts which are identical with or clearly analogous to the corresponding parts of the apparatus shown in FIGS. 2 and 3 are denoted by similar reference characters plus 100. The main difference between the apparatus of FIGS. 2-3 on the one hand and the apparatus of FIG. 4 on the other hand is that the suction inlet 177 of blower 166 is connected with the conduit 167 (i.e., with the conduits 167a and 167b) and that the compressed-air outlet 164 of the blower 166 is connected with the conduit 178 and, therefore, with the interior of the hollow shaft 136. Consequently, each chamber 147 which travels past the testing station is filled with compressed air by way of the orifices 148, compartment 149 and the respective slot 151 of the drum-shaped body 137 of the testing conveyor 124. At the same time, the interior of the wrapper of a filter cigarette 142 of double unit length which travels past the testing station is maintained at a pressure which is below atmospheric pressure because the ends of such cigarette are in communication with the conduits 167a, 167b and therefore with the suction inlet 177 of the blower 166. Otherwise, the operation of the apparatus shown in FIG. 4 is clearly analogous to that of the testing apparatus shown in FIGS. 2 and 3. The transducer 176 furnishes signals whenever the pressure differential between a chamber 147 and the interior of the wrapper of a cigarette 142 in such chamber decreases below a predetermined value which is still indicative of a satisfactory wrapper. The manner in which the tubes 159 which register with successive groups of cradles 141 are movable axislly toward and away from the rotating flange 152 is also the same as in the testing apparatus of FIGS. 2 and 3.

Figure 5:
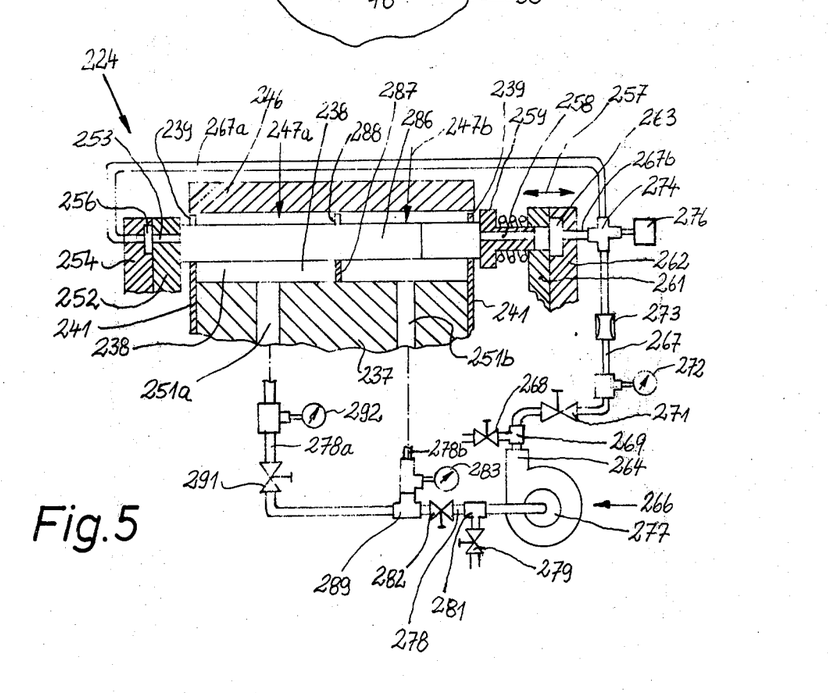
FIG. 5 is a view similar to that of FIG. 2 but showing a third testing apparatus.

Referring to FIG. 5, there is shown a portion of a third testing apparatus wherein all such parts which are identical with or clearly analogous to the corresponding parts of the apparatus shown in FIGS. 2 and 3 are denoted by similar reference characters plus 200. The apparatus of FIG. 5 is designed for the testing of filter cigarettes 286 of unit length. Therefore this apparatus comprises a testing conveyor 224 having a relatively short drum-shaped body 237 supporting two groups of radially extending cradles 241 each of which is provided with a recess or socket 239. Each flute 238 of the drum-shaped body 237 receives a centrally located auxiliary cradle 287 preferably consisting of sheet metal and having a recess or socket 288 which is aligned with the sockets 239 of the corresponding cradles 241. The auxiliary cradle 287 constitutes a partition which subdivides the respective chamber into two shorter chambers 247a and 247b. The junction between the tobacco-containing portion and the filter tip of the cigarette 286 is located in the chamber 247b, i.e., adjacent to that end of the cigarette 286 which is to be sealed by the associated axially movable tube 259.

The drum-shaped body 237 of the testing conveyor 224 is provided with two sets of radially extending slots or channels 251a and 251b which respectively communicate with the corresponding chambers 247a and 247b. The slots 251a and 251b communicate with conduits 278a and 278b, preferably by way of sealingly separated portions of the internal space of a hollow stationary shaft (not shown in FIG. 5) corresponding to the hollow shaft 36 of FIG. 2. The conduits 278a and 278b communicate with a conduit 278 which is connected to the suction inlet 277 of the blower 266. The conduit 278b is connected to the conduit 278 by way of a tee 289 which is further connected with a pressure gauge 283 and is located upstream of an adjustable pressure reducing valve 282. The valve 282 is installed upstream of a second tee 281 which is connected with a second adjustable pressure reducing valve 279. The conduit 278a also branches from the tee 289 and contains an adjustable pressure reducing valve 291 and is connected to a pressure gauge 292. By properly manipulating the valves 279, 282 on the one hand and the valve 291 on the other hand, and by simultaneously observing the pointers of the pressure gauges 283 and 292, an attendant can select the pressures in the chambers 247b and 247a in such a way that the pressure in the chamber 247a is lower or higher than the associated chamber 247b.

The pressure outlet 264 of the blower 266 is connected with a conduit 267 which, in turn, is connected with the conduits 267a and 267b in the same way as shown for the conduits 67a and 67b of FIG. 2. Consequently, when a cigarette 286 advances past the testing station, the pressure in the interior of its wrapper exceeds atmospheric pressure whereas the pressure in the corresponding chambers 247a and 247b is below atmospheric pressure.

The operation of the testing apparatus shown in FIG. 5 is as follows:

The attendant can manipulate the pressure reducing valve 291 in the conduit 278a, by simultaneously observing the pointer of the pressure gauge 292, in such a way that the suction in chamber 247a is les pronounced than the suction in the associated chamber 247b. The pressure in the chamber 247b can be selected by appropriate adjustment of the valves 279 and 282. Consequently, the testing apparatus of FIG. 5 is more sensitive in the region of the junctions of tobacco-containing sections and filter plugs of cigarettes 286 and is less sensitive in the region of the free ends of the tobacco-containing sections. The apparatus of FIG. 5 renders it possible to segregate all such filter cigarettes 286 whose wrappers exhibit even minor defects adjacent to the filter plugs but to leave with the remaining cigarettes all such filter cigarettes 286 which may exhibit minor or even major defects in those portions of the wrappers which are adjacent to the tobacco-containing ends thereof.

It is clear that the testing apparatus of FIG. 5 can be modified so as to resemble the apparatus of FIG. 4. Thus, the chambers 247a and 247b can be connected to the pressure outlet 264 and the conduits 267a and 267b can be connected to the suction inlet 277 of the blower 266 without appreciably affecting the mode of operation of the apparatus.

An important advantage of the improved testing apparatus is that it enables the attendent to change its sensitivity not only as regards the overall quality of the testing operation but also as regards the localization of testing operation to a particular portion of a rod-shaped article. As mentioned before, the testing operation is preferably carried out in such a way that the apparatus is less sensitive in the regions which are adjacent to the tobacco-containing ends of the articles but is much more sensitive in the region of the filter plug where eventual leaks are most likely to be irritating to the purchaser. It is clear, however, that the apparatus will normally operate in such a way that it will readily detect relatively large leaks in the tobacco-containing ends of the articles. By enabling the attendant to select and change the sensitivity of the apparatus lengthwise of the tested article, there is provided the possibility to subject selected portions of articles to more intensive testing than the remaining portions of such articles. This is of considerable importance in the mass-production of filter cigarettes or analogous smokers' products which are being turned out at an extremely high rate so that the segregation of all articles which exhibit minor or extremely minor defects might result in an excessive reduction of the output.

Another important advantage of the testing apparatus is that the pressure in the interior of the tested articles need not deviate substantially from atmospheric pressure. This is due to the fact that, if pressure in a wrapper is above atmospheric pressure, the pressure outside of such wrapper is below atmospheric pressure. Therefore, the necessary pressure differential can be achieved without substantially raising the pressure in the wrapper above or without substantially reducing such pressure below atmospheric pressure. This is desirable for reasons which were explained hereinbefore, for example, to reduce the complexity of the device or devices which evaluate the signals furnished by the transducer.

Without further analysis, the foregoing will so fully reveal the gist of the present invention that others can, by applying current knowledge, readily adapt it for various applications without omitting features which fairly constitute essential characteristics of the generic or specific aspects of my contribution to the art and, therefore, such adaptations should and are intended to be comprehended within the meaning and range of equivalence of the claims.

What is claimed as new and desired to be protected by Letters Patent is set forth in the appended:

1. A method of testing cigarettes or analogous articles having or consisting of open-ended tubular wrappers, comprising the steps of maintaining a first body of gas in the interior of the wrapper of an article to be tested at a first pressure; simultaneously maintaining a second body of gas around the wrapper of said article to be tested at at least one second pressure, one of said first and second pressures exceeding and the other of said first and second pressures being less than atmospheric pressure so that the gas flows from the higher-pressure body, through the leaky part or parts of a defective wrapper, and to the lower-pressure body whereby the pressure of gas in said lower-pressure body increases and the pressure of gas in said higher-pressure body decreases; and monitoring the changes of gas pressure in at least one of said bodies.

2. A method as defined in claim 1, wherein the pressure of said second body of gas is less than atmospheric pressure.

3. A method as defined in claim 1, wherein the pressure of said second body of gas exceeds atmospheric pressure.

4. A method as defined in claim 1, further comprising the step of subdividing said second body of gas into a plurality of at least partially segregated bodies each of which surrounds a different portion of the wrapper, as considered in the axial direction of said article, and maintaining said at least partially segregated bodies at different pressures.

5. A method as defined in claim 1, wherein said second body of gas surrounds only a portion of the wrapper as considered in the axial direction of said article.

6. A method as defined in claim 5, wherein said portion is an intermediate portion of the wrapper.

7. A method as defined in claim 1, further comprising the step of moving said article sideways while said first and second bodies of gas are respectively maintained at said first and second pressures.

8. A method as defined in claim 1, wherein said monitoring step comprises determining the pressure of said first body of gas.

9. Apparatus for testing cigarettes or analogous articles having or consisting of open-ended tubular wrappers, comprising sealing means having parts arranged to engage the wrapper of an article to be tested in the region of each end of the wrapper to restrict the flow of a gas between the interior of the wrapper and the atmosphere by way of the open ends of the thus engaged wrapper; means for maintaining in the thus engaged wrapper a first body of gas at a first pressure; means for confining around the thus engaged wrapper a second body of gas at at least one second pressure, one of said first and second pressures exceeding and the other of said first and second pressures being less than atmospheric pressure so that the gas flows from the higher-pressure body, through the leaky part or parts of a defective wrapper, and to the lower-pressure body whereby the pressure of gas in said lower-pressure body increases and the pressure of gas in said higher-pressure body decreases; and means for monitoring the changes of gas pressure in at least one of said bodies.

10. Apparatus as defined in claim 9, wherein said means for confining comprises a chamber spacedly surrounding at least a portion of the wrapper and means for maintaining the body of gas in said chamber at said second pressure.

11. Apparatus as defined in claim 10, wherein said means for confining further comprises wrapper supporting means.

12. Apparatus as defined in claim 11, wherein said supporting means includes cradles located at the ends of said chamber, as considered in the axial direction of the wrapper which is engaged by said sealing means.

13. Apparatus as defined in claim 10, wherein said chamber is shorter than the distance between the open ends of a wrapper which is engaged by said sealing means.

14. Apparatus as defined in claim 10, wherein the pressure of said second body in said chamber is less than atmospheric pressure.

15. Apparatus as defined in claim 10, wherein the pressure of said second body of gas in said chamber exceeds atmospheric pressure.

16. Apparatus as defined in claim 10, wherein said means for confining further comprises means for subdividing said chamber into a plurality of smaller chambers which are at least partially sealed from each other and said means for maintaining the body of gas in said second chamber at said second pressure includes means for maintaining the interior of said smaller chambers at second pressures different from each other.

17. Apparatus as defined in claim 10, wherein said means for confining further comprises conveyor means defining a first portion of said chamber and stationary cover means adjacent to the path of movement of said conveyor means and defining the remaining portion of said chamber.

18. Apparatus as defined in claim 9, wherein said means for monitoring includes transducer means arranged to measure the gas pressure in the interior of the wrapper which is engaged by said sealing means.

19. Apparatus as defined in claim 18, wherein said transducer is connected with said sealing means and said sealing means is provided with channel means communicating with at least one end of the wrapper which is engaged by said sealing means.

20. Apparatus as defined in claim 9, wherein at least one of said means for maintaining and said means for confining includes means for regulating the pressure of the respective body of gas.

* * * * *